United States Patent [19]

Morita et al.

[11] Patent Number: 5,144,060

[45] Date of Patent: Sep. 1, 1992

[54] BETAINE ESTERS OF POLYOXYALKYLENE ETHER

[75] Inventors: Hiroshi Morita, Chiba; Eiichi Hirota, Funabashi; Yasuo Ishizaki, Tokyo, all of Japan

[73] Assignee: Lion Corporation, Tokyo, Japan

[21] Appl. No.: 568,670

[22] Filed: Aug. 15, 1990

Related U.S. Application Data

[63] Continuation of Ser. No. 251,007, Sep. 27, 1988, abandoned, which is a continuation of Ser. No. 869,781, Jun. 2, 1986, abandoned.

[30] Foreign Application Priority Data

| Jun. 4, 1985 | [JP] | Japan | 60-120975 |
| Oct. 11, 1985 | [JP] | Japan | 60-226406 |
| Dec. 27, 1985 | [JP] | Japan | 60-295186 |

[51] Int. Cl.$^5$ ............................................. C07C 229/00
[52] U.S. Cl. ................................. 560/170; 526/911; 560/155; 560/173
[58] Field of Search ............... 564/287; 560/170, 173, 560/155

[56] References Cited

U.S. PATENT DOCUMENTS

| 3,265,719 | 8/1966 | Cowen | 560/170 |
| 3,759,982 | 9/1973 | Samour | 560/170 |
| 4,692,502 | 9/1987 | Uebele | 526/193 |

FOREIGN PATENT DOCUMENTS 130509 9/1979 Japan.
157750 9/1983 Japan.

OTHER PUBLICATIONS

Chem Abst(2)101, 16512h, 1984 (Rev Chim).

*Primary Examiner*—Christopher Henderson
*Attorney, Agent, or Firm*—Armstrong, Nikaido, Marmelstein, Kubovcik & Murray

[57] ABSTRACT

An emulsifying agent for emulsion polymerization comprising at least one compound selected from the group consisting of (i) betaine esters of polyoxyalkylene alkyl ethers, (ii) betaine esters of polyoxyalkylene alkylphenyl ethers, (iii) betaine esters of polyoxyalkylene dialkylphenyl ethers, (iv) betaine esters of polyoxyalkylene phenyl ethers having two or more benzene nuclei, and (v) betaine esters of polyoxyalkylene polyol ethers. This emulsifying agent is suitable for use in the emulsion polymerization of polymer emulsions capable of forming a film having an excellent water resistance, transparency, and smoothness.

4 Claims, No Drawings

BETAINE ESTERS OF POLYOXYALKYLENE ETHER

This application is a continuation of Ser. No. 251,007 filed Sept. 27, 1988, now abandoned which is a continuation of U.S. Ser. No. 869,781 filed June 2, 1986, now abandoned.

BACKGROUND OF THE INVENTION

1. Field of the Invention

The present invention relates to emulsifying agents for emulsion polymerization. More specifically, it relates to emulsifying agents suitable for use in the emulsion polymerization of polymer emulsions capable of forming a film having an excellent water resistance, transparency, and smoothness.

2. Description of the Related Art

Various surfactants have been heretofore used as emulsifying agents in the production of polymer emulsions from the emulsion polymerization of unsaturated monomers. Of these surfactants, cationic surfactants such as alkyl trimethyl ammonium salts, dialkyl dimethyl ammonium salts, polyoxyethylene alkyl amine, polyoxyethylene alkyl trimethylene diamine, polyoxyethylene alkylmethyl ammonium salts, polyoxyethylene alkyl dimethyl trimethylene ammonium salts, 2-alkyl-N-carboxymethyl-N-hydroxyethyl imidazolium betaine, 2-alkyl-N-carboxyethyl-N-hydroxyethyl imidazolium betaine, and N-alkyl dimethyl amine oxide are widely used.

When the above-mentioned conventional emulsifying agents are used, however, a large amount of agglomerates are formed during the polymerization and the particle sizes of the resultant polymer emulsions become large. In addition, the mechanical stability, chemical stability, and storage stability of the resultant polymer emulsions are adversely affected due to the use of the conventional emulsifying agents. Furthermore, when the polymer emulsions are used as a coating composition and an adhesive, the properties thereof are also affected due to the use of the conventional emulsifying agents.

On the other hand, it has been proposed in, for example, Angew. Chem. ,71, 604 (1959) that decomposable glycine betaine alkyl esters be used as a cationic surfactant to solve the above-mentioned problems. However, when the glycine betaine alkyl esters are used as an emulsifying agent, the film formed from the resultant polymer emulsion has a poor water resistance, transparency, and smoothness.

SUMMARY OF THE INVENTION

Accordingly, the objects of the present invention are to eliminate the above-mentioned problems of the conventional emulsifying agents and to provide an emulsifying agent suitable for use in the emulsion polymerization of polymer emulsions capable of forming a film having an excellent water resistance, transparency, and smoothness.

Another object of the present invention is to provide an emulsifying agent having reduced foaming properties and good antifoaming effects.

Other objects and advantages of the present invention will be apparent from the following description.

In accordance with the present invention, there is provided an emulsifying agent for emulsion polymerization comprising at least one compound selected from the group consisting of (i) betaine esters of polyoxyalkylene alkyl ethers, (ii) betaine esters of polyoxyalkylene alkylphenyl ethers, (iii) betaine esters of polyoxyalkylene dialkylphenyl ethers, (iv) betaine esters of polyoxyalkylene phenyl ethers having two or more benzene nuclei, and (v) betaine esters of polyoxyalkylene polyol ethers.

DESCRIPTION OF THE PREFERRED EMBODIMENTS

The betaine esters usable in the present invention can be typically represented by the following general formulae (I) to (V).

(1) Betaine esters of polyoxyalkylene alkyl esters (i.e., AEB):

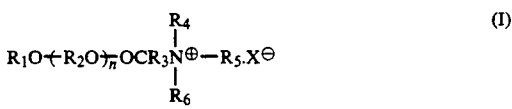

wherein $R_1$ represents an alkyl or alkenyl group having 8 to 20 carbon atoms, $R_2$ represents an alkylene group having 2 to 4 carbon atoms, $R_3$ represents an alkylene group having 1 to 5 carbon atoms, $R_4$ to $R_6$ independently represent an alkyl group having 1 to 3 carbon atoms or $-C_2H_4OH$, n represents an average addition mole number of 1 to 20, and X represents an inorganic or organic anion.

(II) Betaine esters of polyoxyalkylene alkylphenyl ethers (i.e., APEB):

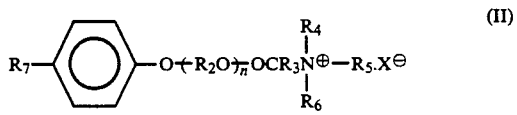

wherein $R_2$ represents an alkylene group having 2 to 4 carbon atoms, $R_3$ represents an alkylene group having 1 to 5 carbon atoms, $R_4$ to $R_6$ independently represents an alkyl group having 1 to 3 carbon atoms or $-C_2H_4OH$, $R_7$ represents an alkyl group having 6 to 20 carbon atoms, n represents an average addition mole number of 1 to 20, and X represents an inorganic or organic anion.

(III) Betaine esters of polyoxyalkylene dialkylphenyl ethers (i.e., DAPEB):

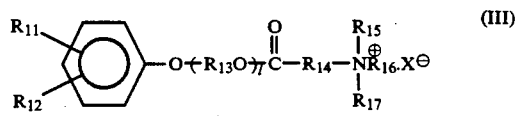

wherein $R_{11}$ and $R_{12}$ independently represent an alkyl group having 6 to 20 carbon atoms, $R_{13}$ represents an alkylene group having 2 to 4 carbon atoms, $R_{14}$ represents an alkylene group having 1 to 5 carbon atoms, $R_{15}$, $R_{16}$, and $R_{17}$ independently represent an alkyl group having 1 to 3 carbon atoms or $-C_2H_4OH$, l is an average addition mole number of 1 to 30, and X is an inorganic or organic anion.

(IV) Betaine esters of polyoxyalkylene phenyl ethers having two or more benzene nuclei (i.e., DBPEB):

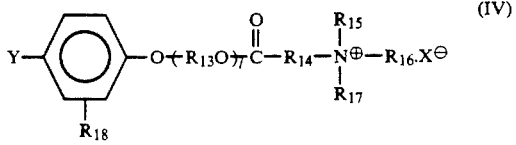

(IV)

wherein $R_{13}$ represents an alkylene group having 2 to 4 carbon atoms, $R_{14}$ represents an alkylene group having 1 to 5 carbon atoms, $R_{15}$, $R_{16}$, and $R_{17}$ independently represent an alkyl group having 1 to 3 carbon atoms or $-C_2H_4OH$, $R_{18}$ represents a hydrogen atom or an alkyl group having 1 to 20 carbon atoms, l is an average addition mole number of 1 to 30, X is an inorganic or organic anion, and Y represents

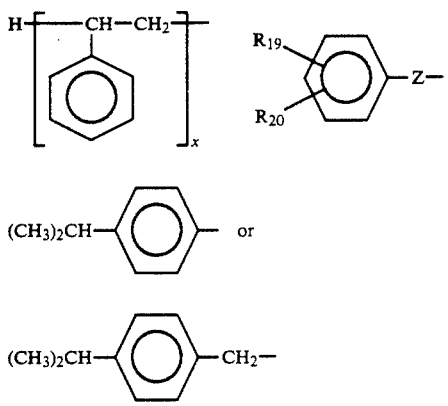

wherein $R_{19}$ and $R_{20}$ represent a hydrogen atom or an alkyl group having 1 to 20 carbon atoms, x is an integer of 1 to 5, and Z represents an alkylene group having 3 to 8 carbon atoms, an oxygen group, a sulfur group, or a carbonyl group.

(V) Betaine ester of polyoxyalkylene polyol ethers (i.e., APOEB):

(V)

wherein Aalc represents a polyol residue having 8 to 20 carbon atoms and $Bt_1$ to $Bt_5$ independently represent a hydrogen atom, a hydroxyl group, or

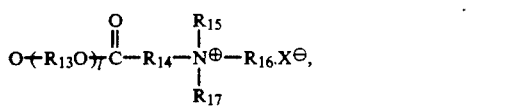

wherein $R_{13}$ represents an alkylene group having 2 to 4 carbon atoms, R represents an alkylene group having 1 to 5 carbon atoms, $R_{15}$, $R_{16}$, and $R_{17}$ independently represents an alkyl group having 1 to 3 carbon atoms or $-C_2H_4OH$, l is an average addition mole number of 1 to 30, and X represents an inorganic or organic anion.

In the above-mentioned general formulae (I) to (V), $R_1$ may be linear or branched groups preferably having 10 to 18 carbon atoms, $R_7$ may be linear or branched groups preferably having 8 to 18 carbon atoms, $R_{11}$ and $R_{12}$ may be linear or branched groups preferably having 8 to 18 carbon atoms, $R_{18}$ may be linear or branched groups preferably having 1 to 12 carbon atoms when $R_{18}$ is an alkyl group, and the alcohol residue Aalc may be linear or branched groups preferably having 10 to 18 carbon atoms. In addition, the alkylene oxide units $-R_2O-$ or $-R_{13}O-$ may be introduced into the higher aliphatic residues, the long-chain alkylphenol residues, the long-chain dialkylphenol residues, the phenol residues having two to more benzene nuclei, and the polyol residues by addition polymerizing one or more alkylene oxides such as ethylene oxide, propylene oxide, and butylene oxide, preferably ethylene oxide thereto. When two or more alkylene oxides are addition polymerized, the addition may be in either the form of the so-called random addition or a block addition. The preferable average addition mole number of the alkylene oxide is 1 to 20, more preferably 3 to 15. Furthermore, X in the above-mentioned general formulae (I) to (V) preferably represents inorganic anions such as halides (e.g., $Cl^-$, $Br^-$) and organic anions such as $CH_3COO^-$, $OSO_3CH_3^-$, and $OSO_3C_2H_5^-$.

Examples of the betaine esters of polyoxyalkylene polyol esters according to the above-mentioned general formula (V) can be represented by the following general formula (V')

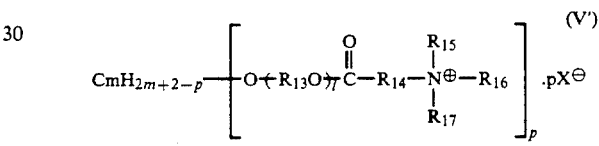

(V')

wherein $R_{13}$, $R_{14}$, $R_{15}$, $R_{16}$, $R_{17}$, m, p, l, and X are the same as defined above.

The above-mentioned compounds AEB, APEB, DAPEB, DBPEB, and APDEB having the general formulae (I) to (V) may be prepared in various manners.

For example, when the compounds (I) and (II) are prepared, higher aliphatic alcohols (A) or long-chain alkylphenols (B) are used as a starting material.

$R_1OH$ (A)

(B)

wherein $R_1$ and $R_7$ are the same as defined above.
That is, an alkylene oxide is added to the staring material to form alkoxylates. The resultant alkoxylates are reacted with lower haloalkyl carboxylic acids to form the esters, followed by reacting with lower trialkyl amines such as trimethyl amine and triethyl amine. Thus, the desired compounds (I) and (II) can be obtained. The anion $X^\ominus$ of the resultant compounds may be optionally converted to organic anions by using, for example, ion-exchange methods.

Furthermore, when the compounds (III), (IV), and (V) can be prepared in the same manner as in the case of the compounds by using, as starting materials, the following compounds (C), (D), and (E).

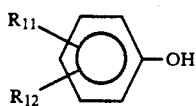  (C)

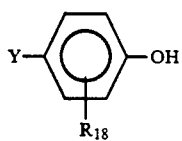  (D)

Aalc (OH)$_y$  (E)

wherein $R_{11}$, $R_{12}$, $R_{18}$, Y, and Aalc are the same as defined above and y is an integer of 2 to 5.

Generally speaking, the emulsion polymerization process comprises three steps; emulsification, polymerization, aging. When the emulsifying agents according to the present invention are used in the emulsion polymerization process, the unsaturated monomers and water can be emulsified to form microemulsification states because of the excellent emulsification properties of the present emulsifying agents. Furthermore, a portion of the betaine esters according to the present invention is decomposed during the polymerization and aging steps and the resultant decomposed products cooperatively act as a cosurfactant. Thus, polymer emulsions having an excellent polymerization stability and a good water resistance, transparency, and smoothness can be obtained.

Furthermore, when the betaine esters according to the present invention (i.e., AEB, APEB, DAPEB, DBPEVM and APOEB) are used in combination with conventional cosurfactants, the above-mentioned cooperative effects can be effectively and advantageously obtained. As a result, the particle size of the polymer emulsion obtained therefrom can be further reduced. Examples of such cosurfactants are as follows:

(VI) Polyoxyethylene alkyl ethers:

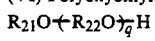  (VI)

(VII) Polyoxyethylene alkylphenyl ethers:

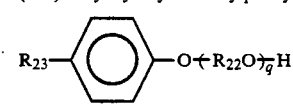  (VII)

(VIII) Polyoxyalkylene dialkylphenyl ethers:

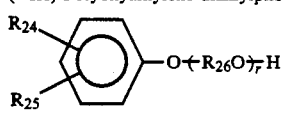  (VIII)

(IX) Polyoxyalkylene phenyl ether having two or more benzene nuclei:

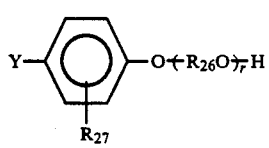  (IX)

(X) Polyoxyalkylene polyol ethers:

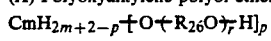  (X)

wherein $R_{21}$ represents an alkyl or alkenyl group having 8 to 20 carbon atoms, $R_{22}$ represents an alkylene group having 2 to 4 carbon atoms, $R_{23}$ represents an alkyl group having 6 to 20 carbon atoms, $R_{24}$ and $R_{25}$ independently represent an alkyl group having 6 to 20 carbon atoms, $R_{26}$ represents an alkylene group having 2 to 4 carbon atoms, $R_{27}$ represents a hydrogen atom or an alkyl group having 1 to 20 carbon atoms, q is an average addition mole number of 1 to 20, r is an average addition mole number of 1 to 30, m is an integer of 8 to 20, p is an integer of 2 to 5.

When the cosurfactants are used, the present emulsifying agents (a) and the cosurfactants (b) are used in an amount of, preferably, (a)/(b)=99/1 to 6/4, more preferably 98/2 to 65/35. The use of a too large amount of the cosurfactants tends to cause the unpreferable decrease in the characteristics of the films formed from the resultant polymer emulsions. When the cosurfactants (b) are used, the use of the cosurfactants having the structures similar to those of the alcohol or phenol portions of the emulsifying agents to be used is preferable. The cosurfactants may be separately added to the emulsion polymerization mixture. However, when the cosurfactants having the structures similar to the portion of the emulsifying agents (i.e., the starting compounds of the emulsifying agents) are used, the betaine esters according to the present invention are prepared in such a manner that the starting compounds (i.e., the cosurfactants) remain in the reaction mixture. Thus, the mixtures of the emulsifying agents and the cosurfactants can be prepared in the production step of the emulsifying agents and the mixtures can be directly used in the emulsion polymerization.

The emulsifying agents according to the present invention can provide sufficient action as an emulsifying agent for the emulsion polymerization even when used alone. However, nonionic surfactants and polymer substances capable of functioning as a protective colloid for the polymer emulsions can be optionally used in addition to the present emulsifying agents.

Examples of such nonionic surfactants are polyoxyethylene alkyl amine, polyoxyethylene alkyltrimethylene diamine, polyoxyethylene fatty acid esters, and polyoxypropylene-polyoxyethylene glycol (i.e., Pluronic type surfactants). Especially, polyoxyethylene type nonionic surfactants having an average addition mole number of ethylene oxide of 5 to 80, preferably 8 to 60, based on one active hydrogen atom.

Examples of the above-mentioned water-soluble polymer substances are polyvinyl alcohol and hydroxyethyl cellulose. When used, the nonionic surfactants and/or the water-soluble polymer substances are preferably used, together with the betaine esters according to the present invention, in an amount of 0.05 to 1.0 parts by weight based on 1 part by weight of the betaine esters.

The emulsifying agents according to the present invention can be used for the emulsion polymerization of one or more of various unsaturated monomers. Examples of such monomers are aliphatic multi-unsaturated hydrocarbons such as butadiene, isoprene, 1,3-pentadiene, chloroprene, cyclopentadiene, and hexadiene; halogenated products of the aliphatic multi-unsaturated hydrocarbons; aromatic multi-unsaturated hydrocarbons such as divinylbenzene and diisopropylbenzene; diester compounds of (meth)acrylic acid or crotonic acid with diols such as ethylene glycol, diethylene glycol, polyethylene glycol, propylene glycol, dipropylene glycol, polypropylene glycol, polyethylene glycol-polypropylene glycol block copolymer, 1,3-butylene glycol, and hydrogenated bisphenol A; diether and divinyl ether compounds of the above-mentioned diols with (meth)allyl alcohol or chroton alcohol; polyester compounds of (meth)acrylic acid or chrotonic acid with polyols such as glycerol, trimethylol propane, and pentaerythritol; polyether compounds and polyvinyl ether compounds of said polyols with (meth)allyl alcohol or crotonyl alcohol; methyl salt compounds of metals such as magnesium and calcium with (meth)acrylic acid or chrotonic acid; ester compounds and vinyl ester compounds of (meth)acrylic acid or chrotonic acid with (meth)allyl alcohol or chrotone alcohol; diester compounds and divinyl ester compounds of dibasic acids such as phthalic acid, isophthalic acid, terephthalic acid, oxalic acid, succinic acid, adipic acid, maleic acid, fumaric acid, and itaconic acid with (meth)allyl alcohol or crotonyl alcohol; polyester compounds and polyvinyl ester compounds of polybasic acids such as trimellitic acid and pyromellitic acid with (meth)allyl alcohol or crotonyl alcohol; metal salt compounds of metals such as magnesium and calcium with vinyl sulfonic acid or styrene-p-sulfonic acid; unsaturated monobasic acids such as (meth)acrylic acid and crotonic acid; unsaturated dibasic acids such as maleic acid, fumaric acid, and itaconic acid; monoester compounds of unsaturated dibasic acids with monoethers of diols such as ethylene glycol, diethylene glycol, triethylene glycol, propylene glycol, and tripropylene glycol and lower monohydric alcohols such as methyl alcohol, ethyl alcohol, and butyl alcohol; unsaturated alcohols such as (meth)allyl alcohol and crotonyl alcohol; vinyl ether compounds of polyols such as ethylene glycol, diethylene glycol, triethylene glycol, propylene glycol, dipropylene glycol, tripropylene glycol, 1,3-butyrene glycol, bisphenol A hydroxide, glycerol, trimethylol propane, and pentaerithritol; ether compounds of the polyols with (meth)allyl alcohol or crotoxyl alcohol; monoester compounds of the polyols with (meth)acrylic acid or crotonic acid; ester compounds of monoalcohols such as methyl alcohol, ethyl alcohol, isopropyl alcohol, butyl alcohol, 2-ethylhexyl alcohol, dodecyl alcohol, stearyl alcohol, phenyl alcohol, and benzyl alcohol with (meth)acrylic acid or crotonic acid; diester compounds of the monohydric alcohol with unsaturated dibasic acids such as maleic acid, fumaric acid, itaconic acid, and citraconic acid; ester compounds of monoether compounds of diols such as ethylene glycol, diethylene alcohol, and triethylene glycol and monohydric alcohols such as methyl alcohol ethyl alcohol, and butyl alcohol with (meth)acrylic acid or crotonic acid; diester compounds of the monoether compounds with the unsaturated dibasic acids, olefin hydrocarbons such as ethylene, propylene, butylene, isobutylene, octene, isooctene, decene, and dodecene; aromatic vinyl compounds such as styrene, chlorostyrene, 2-methylstyrene, vinyl toluene, vinyl xylene, and vinyl naphthalene; vinyl halides such as vinyl fluoride, vinyl chloride, and vinyl bromide; vinylidene halides such as vinylidene fluoride, vinylidene chloride, and vinylidene bromide; unsaturated cyan compounds such as (meth)acrylonitrile, croton nitrile, 2-cyanoethyl acrylate, 2-chloroacrylonitrile, and vinylidene cyanide; vinyl ester compounds of carboxylic acids such as acetic acid, propionic acid, butyric acid, lauric acid, stearic acid, benzoic acid, p-tert-butyl-benzoic acid, and hersatic acid; ester compounds of monocarboxylic acid with (meth)allyl alcohol or crotonyl alcohol; vinyl ether compounds of monohydric alcohols such as methyl alcohol, ethyl alcohol, propyl alcohol, butyl alcohol, 2-ethylhexyl alcohol, dodecyl alcohol, stearyl alcohol, phenyl alcohol, and benzyl alcohol; ether compounds of the monohydric alcohols with (meth)allyl alcohol or crotonyl alcohol; vinyl ether compounds of monoether compounds of aliphatic monohydric alcohols having 1 to 4 carbon atoms with diols such as ethylene glycol, diethylene glycol, triethylene glycol, propylene glycol, dipropylene glycol, and tripropylene glycol; ether compounds of monoether compounds with (meth)allyl alcohol or crotonyl alcohol; unsaturated aldehydes such as (meth) acrolein and croton aldehydes; (meth)acrylates having an amino group such as diethylaminomethyl(meth)acrylate and diethylaminoethyl(meth)acrylate and the quaternary salts thereof cationized with methyl chloride; unsaturated glycidyl esters such as glycidyl(meth)acrylate; glycidyl ether such as (meth)allyl glycidyl ether; unsaturated amides such as (meth)acrylamide, dimethyl(meth)acrylamide, and dimethylaminopropyl(meth)acrylamide, and the quaternary salts thereof cationized with methyl chloride; unsaturated amide derivatives such as methylol (meth) acrylamide and alkyl ether compounds of these acrylamides having $C_1$ to $C_4$ alkyl group.

When the above-mentioned unsaturated monomers are polymerized or copolymerized by using the emulsifying agents according to the present invention, any polymerization initiators generating cationic or nonionic free radicals can be used. Example of such initiators are inorganic and organic salts of 2,2'-azobis (2-amidinopropane), hydrogen peroxide and the combinations thereof with reducing agents, cumene hydroperoxide, tert-butyl hydroperoxide and the combinations thereof with reducing agents, as well as potassium persulfate and ammonium persulfate.

The emulsifying agents according to the present invention can be used in the same manner as in the conventional emulsifying agents when emulsion polymerizing the above-mentioned unsaturated monomers. For example, the unsaturated monomers are emulsified in an amount of 20% to 70% by weight, typically, in water in the presence of 0.1% to 10% by weight, based on the weight of the unsaturated monomer, of emulsifying agent, and the emulsion polymerization is then carried out by adding 0.1% to 2% by weight, based on the weight of the unsaturated monomer, of polymerization initiators. Furthermore, a $p^H$ adjustor, a polymerization degree regulator, and other conventional additives can be used as in the conventional manner.

When the polymer obtained from the emulsion polymerization is recovered from the resultant emulsion, any conventional method including, for example, the addition of inorganic salt electrolytes, the addition of coagulants, and the addition of solvents which are not soluble in polymer substances but are soluble in water, can be used. However, in the preferred embodiment of the present invention, the polymers in the resultant polymer emulsions can be advantageously coagulated or recovered from the polymer emulsions by adjusting the pH of the polymer emulsion systems to 6 or more or by irradiating the resultant polymer emulsions with ultrasonic waves. This is because, when the pH of the polymer emulsion is adjusted to 6, preferably 7 to 12, more preferably 8 to 11, or when the polymer emulsion is irradiated with ultrasonic waves having a frequency of 200 KHz or less, preferably 100 KHz or less, the ester bond portions of the betaine esters according to the present invention are readily decomposed.

As mentioned above, the emulsifying agents for emulsion polymerization according to the present invention have no disadvantages when compared to the conventional cationic emulsifying agents. Furthermore, the films formed from the polymer emulsions obtained by the present emulsifying agent exhibit a remarkably excellent water resistance, transparency, and smoothness. Especially when the betaine esters of polyoxyalkylene dialkylphenyl ethers, the betaine esters of polyoxyalkylene phenyl ethers having two or more benzene nuclei, or the betaine esters of polyoxyalkylene polyol ethers are used, emulsions exhibiting low forming properties and good antifoaming effects can be obtained. Furthermore, the emulsions obtained by the present emulsifying agents have a good chemical stability, freezing stability, and storage stability.

Accordingly, the polymer emulsions obtained by using the present emulsifying agents are suitable for utilization in conventional applications such as coating compositions or paints, especially baking paints, adhesives, tackifiers, and fiber and paper finish, as well as the formation of electrically conductive film. Furthermore, when the polymer emulsions obtained by using the present emulsifying agents are used in the anti-static treatment of, for example, fibers, woven fabrics, non-woven fabrics, and molded products of synthetic resins, electrically conductive treatments of, for example, reprographic paper and statically recording paper, as well as molding additives for magnetic materials and fine ceramics, excellent effects, which are not conventionally exhibited, can be obtained.

Furthermore, the polymer emulsions obtained by using the present emulsifying agents are advantageously used as binders of heat-sensitive recording paper. Thus, the heat-sensitive recording paper having an improved water resistant heat-sensitive recording layer and an excellent sensitivity and good image quality can be provided.

EXAMPLES

The present invention now will be further illustrated by, but is by no means limited to, the following Examples and Comparative Examples, wherein all parts are by weight unless otherwise specified.

Example 1

A glass reaction vessel provided with a thermometer, an agitator, a reflux condenser, and a dropping funnel was charged with 3 parts of an emulsifying agent listed in Table 1 and 110 parts of water. The emulsifying agent was dissolved in the water and the system was replaced with nitrogen. Further, 70 parts of ethyl acrylate and 30 parts of methyl methacrylate were mixed to separately prepare the unsaturated monomer mixture.

A 10 part amount of the unsaturated monomer mixture and 5 parts of a 5% aqueous 2,2'-azobis(amidinopropane)hydrochloride solution were added to the reaction vessel and the polymerization was then started at a temperature of 60° C. Thereafter, the remaining 90 parts of the unsaturated monomer mixture was continuously dropwise added to the reaction vessel over 90 minutes. At this time, 5 parts of a 5% aqueous 2,2'-azobis(amidinopropane)hydrochloride solution was added with a half of the above amount of the unsaturated monomer mixture. After completing the addition of the unsaturated monomer mixture, the polymerization mixture was aged at a temperature of 60° C. for 90 minutes.

The polymer emulsion thus obtained was cast on a glass plate having a size of 6 cm × 8 cm and was then air dried at room temperature to form a polymer film having a thickness of 0.2 mm. The characteristics of the film thus obtained were evaluated as follows.

(1) Water resistance: The polymer film after air drying was heated at a temperature of 160° C for 4 hours and the film was then fully immersed in water contained in a Petri dish at a temperature of 20° C. The time interval for which newspaper typed letters having a size of 8 points could not be read was determined. The results are shown in the unit of hours.

(2) Transparency: The haze of the polymer film was determined by a haze meter.

(3) Smoothness: The surface conditions of the polymer film was visually observed and the results were evaluated according to the following standards.

◯ . . . Smooth and glossy film
Δ . . . Film having slight wrinkles and crazing
x . . . Film having remarkable wrinkles and crazing
The results are shown in Table 1.

As is clear from the results shown in Table 1, when the emulsifying agents according to the present invention are used, polymer films having an excellent water resistance, transparency, and smoothness were obtained when compared with the conventional emulsifying agents.

TABLE 1

| | Emulsifying agent Chloroglycine betaine ester of EO addition product of alcohol (or phenol) | | Film characteristics | | |
|---|---|---|---|---|---|
| Sample No. | Alcohol (or phenol) | Average EO addition mole No. ($\overline{EOp}$) | Water resistance (hr) | Transparency | Smoothness |
| 1 | $C_{12-14}$ sec. alcohol | 3 | 24 | 13 | ◯ |
| 2 | $C_{18}$ sec. alcohol | 3 | 40 | 6 | ◯ |
| 3 | $C_{12}$ prim. alcohol | 3 | 27 | 20 | ◯ |
| 4 | $C_{16-18}$ prim. alcohol | 3 | 32 | 17 | ◯ |
| 5 | Octyl phenol | 3 | 60 | 11 | ◯ |
| 6 | Dodecyl phenol | 3 | 65 | 9 | ◯ |
| 7* | Chloroglycine betaine lauryl ester | | 3 | 34 | X |
| 8* | Chloroglycine cetostearyl ester | | 7 | 62 | Δ |
| 9* | Polyoxyethylene lauryl ether ($\overline{EOp}$ = 30) | | 8 | 37 | Δ |
| 10* | Polyoxyethylene octylphenyl ether ($\overline{EOp}$ = 30) | | 4 | 39 | Δ |

*Comparative Example

Example 2

The polymer emulsions were prepared in the same manner as in Example 1, except that a mixture of (a)

chloroglycine betaine ester of the ethylene oxide (i.e. EO) addition products of alcohol or phenol and (b) the EO addition products of alcohol or phenol listed in Table 2 in an amount of (a)/(b)=9/1 (weight ratio) was used as the emulsifying agent. The emulsifying agents were prepared in such a manner that, when the betaine ester (a) was prepared from the EO addition products (b), the EO addition products (b) remained in the reaction mixture in the above-mentioned ratio.

The particle sizes of the resultant polymer emulsions were determined by a Coulter counter (manufactured by Coulter Electronics Inc.). The results are shown in Table 2.

From the polymer emulsions obtained above, the polymer films were formed in the same manner as in Example 1 and the characteristics of the polymer film were determined in the same manner as in Example 1. The results are shown in Table 2.

When the cosurfactant component (b), i.e., 3 mole EO addition product of $C_{12-14}$ secondary alcohol, was not used in the sample No. 11 (i.e., corresponding to the sample No. 1 of Example 1), the particle size of the polymer emulsion was 0.20 μm. As is clear from the results shown in Table 2, the use of the cosurfactant component (b) decreases the particle size of the resultant polymer emulsion.

As shown in Table 3, the sample Nos. 4, 21, 22, and 23 according to the present invention gave good results when compared with the Comparative sample Nos. 8 and 24. As is clear from the results shown in Table 3, the suitable $\overline{EOp}$ of the betaine esters is 1 to 20.

TABLE 3

| Sample No. | Emulsifying agent ($\overline{EOp}$) | Film characteristics | | |
|---|---|---|---|---|
| | | Water resistance (hr) | Transparency | Smoothness |
| 8* | 0 | 7 | 62 | Δ |
| 4 | 3 | 32 | 16 | ◯ |
| 21 | 7 | 72 | 13 | ◯ |
| 22 | 12 | 53 | 11 | ◯ |
| 23 | 18 | 30 | 17 | ◯ |
| 24* | 23 | 6 | 31 | Δ |

*Comparative Example

Example 4

The emulsion polymerization of ethyl acrylate and methyl methacrylate was carried out in the same manner as in Example 1, except that the component (a) and the component (b) listed in Table 4 were used in the weight ratio of (a)/(b)=17/3. The emulsifying agents were prepared in such a manner that, when the betaine

TABLE 2

| Sample No. | Emulsifying agent | | Particle size (μm) | Film characteristics | | |
|---|---|---|---|---|---|---|
| | (b) EO addition product of alcohol (or phenol) | | | Water resistance (hr) | Transparency | Smoothness |
| | Alcohol (or Phenol) | $\overline{EOp}$ | | | | |
| 11 | $C_{12-14}$ sec. alcohol | 3 | 0.08 | 27 | 14 | ◯ |
| 12 | $C_{18}$ two chain type prim. alcohol | 3 | 0.06 | 55 | 7 | ◯ |
| 13 | $C_{12}$ prim. alcohol | 3 | 0.07 | 33 | 18 | ◯ |
| 14 | $C_{16-18}$ prim. alcohol | 3 | 0.07 | 38 | 16 | ◯ |
| 15 | Octylphenol | 3 | 0.05 | 84 | 9 | ◯ |
| 16 | Dodecylphenol | 3 | 0.04 | 96 | 8 | ◯ |
| 17* | Stearyl trimethyl ammonium chloride | | Partial coagulation | 3 | 45 | X |
| 18* | Polyoxyethylene lauryl ether ($\overline{EOp}$ = 30) | | 0.6 | 8 | 37 | Δ |
| 19* | Polyoxyethylene nonylphenyl ether ($\overline{EOp}$ = 30) | | 0.5 | 6 | 29 | Δ |
| 20* | Lauryl dimethylamine oxide | | Partial coagulation | 4 | 33 | Δ |

*Comparative Example

Example 3

The emulsion polymerization was carried out in the same manner as in Example 1, except that the chloroglycine betaine esters of polyoxyethylene cetostearyl ethers having various average ethylene oxide addition mole numbers (i.e., EOp) were used as the emulsifying agents.

Polymer films were formed from the polymer emulsions obtained above and the characteristics of the resultant polymer films were evaluated in the same manner as in Example 1. The results are shown in Table 3.

esters of the component (a) were prepared from the component (b) In the above-mentioned ratio in the reaction mixture, some of the component (b) remained as an unreacted component.

The particle sizes of the polymer emulsions obtained above and the characteristics of the polymer films were evaluated in the same manner as mentioned in Example 1.

When the component (a) was used alone, as the emulsifying agent, without using the component (b) in the sample No. 25, the particle size of the polymer emulsion thus obtained was 0.18 μm. In Table 4, the sample Nos. 28 and 32 are Comparative Examples.

The results are shown in Table 4.

TABLE 4

| | Emulsifying agent | | | | | | | | | | | | |
|---|---|---|---|---|---|---|---|---|---|---|---|---|---|
| | Component (a) $R_1-O(R_2O)_n OCR_3N^{\oplus}(R_4)(R_6)-R_5 \cdot X^{\ominus}$ | | | | | | Component (b) $R_1-O(R_2O)_n H$ | | | | Film characteristics | | |
| Sample No. | $R_1$ | $R_2$ | $R_3$ | $R_4, R_5, R_6$ | n | X | $R_1$ | $R_2$ | n | Particle size (μm) | Water resistance | Transparency | Smoothness |
| 25 | $C_{12}H_{25}$ | $C_2H_4$ | $CH_2$ | $C_2H_5$ | 5 | Br | $C_{12}H_{25}$ | $C_2H_4$ | 5 | 0.05 | 49 | 12 | ○ |
| 26 | $C_{12}H_{25}$ | $C_2H_4$ | $CH_2$ | $C_2H_5$ | 12 | Br | $C_{12}H_{25}$ | $C_2H_4$ | 12 | 0.07 | 37 | 16 | ○ |
| 27 | $C_{12}H_{25}$ | $C_2H_4$ | $CH_2$ | $C_2H_5$ | 18 | Br | $C_{12}H_{25}$ | $C_2H_4$ | 18 | 0.08 | 28 | 17 | ○ |
| 28 | $C_{12}H_{25}$ | $C_2H_4$ | $CH_2$ | $C_2H_5$ | 22 | Br | $C_{12}H_{25}$ | $C_2H_4$ | 22 | 0.6 | 5 | 35 | △ |
| 29 | $C_{18}H_{37}$ | $C_2H_4$ | $C_2H_4$ | $CH_3$ | 4 | Cl | $C_{18}H_{37}$ | $C_2H_4$ | 4 | 0.06 | 52 | 7 | ○ |
| 30 | $C_{18}H_{37}$ | $C_2H_4$ | $C_2H_4$ | $CH_3$ | 11 | Cl | $C_{18}H_{37}$ | $C_2H_4$ | 11 | 0.07 | 43 | 13 | ○ |
| 31 | $C_{18}H_{37}$ | $C_2H_4$ | $C_2H_4$ | $CH_3$ | 17 | Cl | $C_{18}H_{37}$ | $C_2H_4$ | 17 | 0.08 | 30 | 16 | ○ |
| 32 | $C_{18}H_{37}$ | $C_2H_4$ | $C_2H_4$ | $CH_3$ | 23 | Cl | $C_{18}H_{37}$ | $C_2H_4$ | 23 | 0.5 | 7 | 29 | △ |

Example 5

The reaction vessel used in Example 1 was charged with 4 parts of the emulsifying agent listed in Table 5 and 110 parts of water. Thus, the emulsifying agent was dissolved in the water.

Further, 50 parts of butyl acrylate and 50 parts of styrene were mixed to separately prepare the unsaturated monomer mixture.

A 10 part amount of the unsaturated monomer mixture and 5 parts of a 5% aqueous 2,2'-azobis(amidinopropane)hydrochloride solution were added to the reaction vessel and the polymerization was then started at a temperature of 60° C. Thereafter, the remaining 90 parts of the unsaturated monomer mixture was continuously dropwise added to the reaction vessel over 90 minutes. At this time, 5 parts of a 5% aqueous 2,2'-azobis(amidinopropane)hydrochloride solution was added with a half of the above amount of the unsaturated monomer mixture. After completing the addition of the unsaturated monomer mixture, the polymerization mixture was aged at a temperature of 60° C. for 90 minutes.

The polymer film was formed from the polymer emulsion obtained above and the characteristics of the polymer film were determined in the same manner as in Example 1.

The results are shown in Table 5.

TABLE 5

| | Emulsifying agent $R_7-\bigcirc-O(R_2O)_n OCR_3N^{\oplus}(R_4)(R_6)-R_5 \cdot X^{\ominus}$ | | | | | | Film characteristics | | |
|---|---|---|---|---|---|---|---|---|---|
| Sample No. | $R_7$ | $R_2$ | $R_3$ | $R_4, R_5, R_6$ | n | X | Water resistance | Transparency | Smoothness |
| 33 | $C_8H_{17}$ | $C_3H_6$ | $CH_2$ | $CH_5$ | 2 | Cl | 80 | 12 | ○ |
| 34 | $C_8H_{17}$ | $C_2H_4$ | $CH_2$ | $C_2H_5$ | 7 | Br | 77 | 10 | ○ |
| 35 | $C_9H_{19}$ | $C_3H_6$ | $CH_2$ | $C_2H_4OH$ | 3 | Cl | 55 | 9 | ○ |
| 36 | $C_9H_{19}$ | $C_2H_4$ | $CH_2$ | $CH_3$ | 5 | Br | 71 | 9 | ○ |
| 37 | | $C_4H_8$ | $CH_2$ | $C_2H_4OH$ | 2 | Cl | 57 | 8 | ○ |
| 38 | $C_9H_{19}$ | $C_3H_6$ $C_2H_4$ | $CH_2$ | $CH_3$ | 1 2 | $CH_3COO$ | 66 | 11 | ○ |
| 39 | $C_{12}H_{25}$ | $C_3H_6$ | $CH_2$ | $C_2H_4OH$ | 5 | Cl | 68 | 11 | ○ |
| 40 | $C_{12}H_{25}$ | $C_2H_4$ | $CH_2$ | $CH_3$ | 10 | Cl | 70 | 8 | ○ |
| 41 | $C_{12}H_{25}$ | $C_2H_4$ | $C_2H_4$ | $CH_3$ | 4 | $CH_3COO$ | 73 | 9 | ○ |
| 42 | $C_{12}H_{25}$ | $C_2H_4$ | $CH_2$ | $CH_3$ | 14 | Cl | 65 | 7 | ○ |
| 43 | $C_{18}H_{37}$ | $C_2H_4$ | $CH_2$ | $CH_3$ | 18 | Cl | 75 | 7 | ○ |

Example 6

The polymer emulsion was obtained in the same manner as in Example 5, except that the reaction vessel was charged with 4 parts of the emulsifying agent comprising the components (a) and (b) listed in Table 6.

The particle size of the polymer emulsion and the characteristics of the polymer film were determined in the same manner as in Example 1. The results are shown in Table 6.

When only the component (a) was used, without the component (b), as the emulsifying agent in the sample No. 44 (i.e., corresponding to the sample No. 34 of Example 5), the particle size of the resultant polymer emulsion was 0.16 μm.

TABLE 6

| | Emulsifying agent | | | | | | | | | | | | | |
|---|---|---|---|---|---|---|---|---|---|---|---|---|---|---|
| | Component (a) $R_7-\bigcirc-O(R_2O)_n OCCH_2N^{\oplus}(R_4)(R_6)-R_5 \cdot X^{\ominus}$ | | | | | | Component (b) $R_7-\bigcirc-O(R_2O)_n H$ | | | | | Film Characteristics | | |
| Sample No. | $R_7$ | $R_2$ | $R_4, R_5, R_6$ | n | X | | $R_7$ | $R_2$ | n | (a)/(b) | Particle size (μm) | Water resistance | Transparency | Smoothness |
| 44 | $C_8H_{17}$ | $C_2H_4$ | $CH_3$ | 5 | Br | | $C_8H_{17}$ | $C_2H_4$ | 5 | 92/8 | 0.04 | 81 | 9 | ○ |
| 45 | $C_8H_{17}$ | $C_3H_6$ | $C_2H_4OH$ | 1 | Cl | | $C_8H_{17}$ | $C_3H_6$ | 1 | 70/30 | 0.03 | 83 | 8 | ○ |

TABLE 6-continued

| | Emulsifying agent | | | | | | | | | | | | |
|---|---|---|---|---|---|---|---|---|---|---|---|---|---|
| | Component (a) $R_7-\bigcirc-O(R_2O)_n OCCH_2\underset{R_6}{\overset{R_4}{N^\oplus}}-R_5.X^\ominus$ | | | | | Component (b) $R_7-\bigcirc-O(R_2O)_n H$ | | | | | Film Characteristics | | |
| Sample No. | $R_7$ | $R_2$ | $R_4, R_5, R_6$ | n | X | $R_7$ | $R_2$ | n | (a)/(b) | Particle size (μm) | Water resistance | Transparency | Smoothness |
| 46 | $C_8H_{17}$ | $C_2H_4$ | $C_2H_5$ | 10 | $CH_3COO$ | $C_8H_{17}$ | $C_2H_4$ | 10 | 85/15 | 0.06 | 74 | 11 | ○ |
| 47 | $C_{12}H_{25}$ | $C_2H_4$ | $CH_3$ | 7 | Cl | $C_{12}H_{25}$ | $C_2H_4$ | 7 | 82/18 | 0.05 | 79 | 10 | ○ |
| 48 | $C_{12}H_{25}$ | $C_4H_8$ | $C_2H_4OH$ | 1 | $CH_3COO$ | $C_{12}H_{25}$ | $C_4H_8$ | 1 | 95/5 | 0.07 | 72 | 12 | ○ |
| 49 | $C_{18}H_{37}$ | $C_2H_4$ | $CH_3$ | 5 | Cl | $C_{18}H_{37}$ | $C_2H_4$ | 5 | 94/6 | 0.03 | 85 | 6 | ○ |
| 50 | $C_{18}H_{37}$ | $C_3H_6$ | $C_2H_4OH$ | 3 | Cl | $C_{18}H_{37}$ | $C_3H_6$ | 3 | 77/23 | 0.08 | 69 | 12 | ○ |
| 51 | $C_{18}H_{37}$ | $C_3H_6$ $C_2H_4$ | $CH_3$ | 1 4 | Cl | $C_{18}H_{37}$ | $C_3H_6$ $C_2H_4$ | 1 4 | 67/33 | 0.04 | 82 | 7 | ○ |
| 52 | $C_{18}H_{37}$ | $C_2H_4$ | $CH_3$ | 15 | Br | $C_{18}H_{37}$ | $C_2H_4$ | 15 | 81/19 | 0.06 | 73 | 12 | ○ |

Example 7

The emulsion polymerization of ethyl acrylate and methyl methacrylate was carried out in the same manner as in Example 1 by using, as an emulsifying agent, (a) chloroglycine betaine ester of polyoxyethylene nonylphenyl ether ($\overline{EOp}=2$) and (b) polyoxyethylene nonylphenyl ether ($\overline{EOp}=2$) in the weight ratio listed in Table 7.

The emulsifying agent was prepared in such a manner that, when the betaine ester of the component (a) was prepared from the component (b), the component (b) remained, as the unreacted compound, in the weight ratio listed in Table 7. In addition, the results obtained by using the component (a) alone are shown as the sample No. 53 in Table 7.

TABLE 7

| | Emulsifying agent | | Particle size (μm) | Film characteristics | | |
|---|---|---|---|---|---|---|
| Sample No. | Component (a) | Component (b) | | Water resistance | Transparency | Smoothness |
| 53 | 100 | 0 | 0.17 | 23 | 18 | ○ |
| 54 | 98 | 2 | 0.1 | 25 | 16 | ○ |
| 55 | 90 | 10 | 0.08 | 53 | 10 | ○ |
| 56 | 75 | 25 | 0.05 | 34 | 6 | ○ |
| 57 | 65 | 35 | 0.09 | 29 | 6 | ○ |

Example 8

A glass reaction vessel provided with a thermometer, an agitator, a reflux condenser, and a dropping funnel was charged with 3 parts of an emulsifying agent listed in Table 8 and 110 parts of water. The emulsifying agent was dissolved in the water and the system was replaced with nitrogen. Further, 70 parts of ethyl acrylate and 30 parts of methyl methacrylate were mixed to separately prepare the unsaturated monomer mixture.

A 10 part amount of the unsaturated monomer mixture and 5 parts of a 5% aqueous 2,2'-azobis(amidinopropane)hydrochloride solution were added to the reaction vessel and the polymerization was then started at a temperature of 60° C. Thereafter, the remaining 90 parts of the unsaturated monomer mixture was continuously dropwise added to the reaction vessel over 90 minutes. At this time, 5 parts of a 5% aqueous 2,2'-azobis(amidinopropane)hydrochloride solution was added with a half of the above amount of the unsaturated monomer mixture. After completing the addition of the unsaturated monomer mixture, the polymerization mixture was aged at a temperature of 60° C. for 90 minutes.

The polymer emulsion thus obtained was cast on a glass plate having a size of 6 cm × 8 cm and was then air dried at room temperature to form a polymer film having a thickness of 0.2 mm. The characteristics of the film thus obtained were evaluated as follows.

(1) Water Resistance: see Example 1.
(2) Transparency: see Example 1.
(3) Smoothness: see Example 1.
(4) Foaming Properties: The polymer emulsion was diluted with water to a solid concentration of 10% by weight. A 30 ml amount of the diluted emulsion was added to a large test tube having a diameter of 25 mm and a height of 220 mm and the test tube was plugged with a stopper. The test tube was shaken in a vertical direction at 100 times per 30 seconds and the height of the foam thus generated was measured in terms of milliliters (ml).

The results are shown in Table 8.

As is clear from the results shown in Table 8, when emulsifying agents according to the present invention are used, the polymer films having an excellent water resistance, transparency, and smoothness were obtained when compared with the conventional emulsifying agents.

In addition, very little foaming of the polymer emulsions of the sample Nos. 58 to 63 obtained above during the polymerization was observed. The foaming properties are also shown in Table 8. The sample Nos. 58 to 65 are Examples according to the present invention and the sample Nos. 66 to 69 are Comparative Examples. As is clear from the results shown in Table 8, the emulsions had low foaming properties and good antifoaming effects, in addition to the excellent water resistance, transparency, and smoothness of the polymer films formed from the polymer emulsions, when the emulsifying agents according to the present invention were used.

TABLE 8

Emulsifying agent

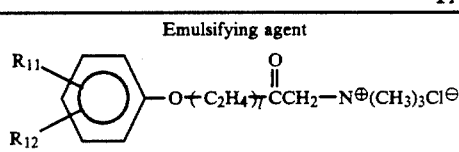

TABLE 8-continued $$Y-\underset{R_{18}}{\underset{|}{\bigcirc}}-O+C_2H_4O\overline{)_l}\overset{O}{\overset{\|}{C}}CH_2-N^{\oplus}(CH_3)_3Cl^{\ominus}$$

| Sample No. | $C_mH_{2m+2-p}$$+O+C_2H_4O\overline{)_l}\overset{O}{\overset{\|}{C}}CH_2-N^{\oplus}(-CH_3)_3.Cl]_p$ | | Water resistance | Film characteristics Transparency | Smoothness | Foaming properties Immediately | After 30 sec. | After 2 min. |
|---|---|---|---|---|---|---|---|---|
| 58 | $R_{11}, R_{12}$ = Octyl | l = 3 | 62 | 13 | o | 42 | 20 | 4 |
| 59 | $R_{11}, R_{12}$ = Dodecyl | l = 3 | 60 | 10 | o | 47 | 22 | 6 |
| 60 | $R_{11}, R_{12}$ = Dodecyl | l = 6 | 56 | 6 | o | 52 | 25 | 9 |
| 61 | Y = Cumyl $R_{18}$ = H | l = 3 | 48 | 13 | o | 41 | 16 | 3 |
| 62 | Y = $C_6H_5CH_2CH_2$ $R_{18}$ = H | l = 3 | 56 | 14 | o | 38 | 14 | 3 |
| 63 | $C_mH_{2m}$ = $C_{12}$-$C_{14}$ Alkylene P = 2 | l = 3 | 34 | 11 | o | 45 | 21 | 7 |
| 64 | $C_mH_{2m}$ = $C_{12}$-$C_{14}$ Alkylene P = 2 | l = 6 | 30 | 7 | o | 48 | 22 | 9 |
| 65 | $C_mH_{2m}$ = $C_{18}$ Alkylene P = 2 | l = 3 | 46 | 12 | o | 47 | 20 | 6 |
| 66* | $C_mH_{2m+1}$ = $C_{12}$-$C_{14}$ sec. Alkylene P = 1 | l = 3 | 24 | 13 | o | 110 | 96 | 77 |
| 67* | $C_mH_{2m+1}$ = $C_{18}$ sec. Alkylene P = 1 | l = 3 | 40 | 6 | o | 100 | 92 | 78 |
| 68* | $R_{11}$ = Octyl $R_{12}$ = H | l = 3 | 60 | 11 | o | 105 | 8 | 70 |
| 69* | $R_{11}$ = Dodecyl $R_{12}$ = H | l = 3 | 65 | 9 | o | 95 | 85 | 76 |

*Comparative Example

Example 9

The polymer emulsions were prepared in the same manner as in Example 8, except that a mixture of (a) chloroglycine betaine ester of the ethylene oxide (i.e. EO) addition products of dialkyl phenol, cumyl phenol, aralkyl phenol, and alkane diol and (b) the EO addition products of dialkyl phenol, cumyl phenol, aralkyl phenol, and alkane diol listed in Table 2 in an amount of (a)/(b)=9/1 (weight ratio) was used as the emulsifying agent. The emulsifying agents were prepared in such a manner that, when the betaine ester (a) was prepared from the EO addition products (b), the EO addition products (b) in the above-mentioned ratio remained in the reaction mixture as an unreacted component.

The particle sizes of the resultant polymer emulsions were determined by a Coulter counter (manufactured by Coulter Electronics Inc. Ltd.). The results are shown in Table 9.

From the polymer emulsions obtained above, polymer films were formed in the same manner as in Example 8 and the characteristics and foaming properties of the polymer films were determined in the same manner as in Example 8. The results are shown in Table 9.

When the cosurfactant component (b), (i.e., the alkoxylate) was not used in the sample Nos. 70, 73, 74, and 75, the particle sizes of the polymer emulsion were 0.18, 0.21, 0.17, and 0.25 μm, respectively. As is clear from the results shown in Table 9, the use of the cosurfactant component (b) decreases the particle size of the resultant polymer emulsion.

Furthermore, it was visually observed that there was very little foaming during the emulsion polymerization.

TABLE 9

Emulsifying agent $$\underset{R_{12}}{\overset{R_{11}}{\bigcirc}}-O+C_2H_4O\overline{)_l}\overset{O}{\overset{\|}{C}}CH_2-N^{\oplus}(CH_3)_3.Cl^{\ominus}$$

$$Y-\underset{R_{18}}{\overset{}{\bigcirc}}-O+C_2H_4O\overline{)_l}\overset{O}{\overset{\|}{C}}CH_2-\overset{\oplus}{N}(CH_3)_3.Cl^{\ominus}$$

| Sample No. | $C_mH_{2m+2-p}$$+O+C_2H_4O\overline{)_l}\overset{O}{\overset{\|}{C}}-CH_2-\overset{\oplus}{N}(CH_3)_3.\overset{\ominus}{Cl}]_p$·pCl$^-$ | | Particle size (μm) | Water resistance | Film Characteristics Transparency | Smoothness | Foaming properties Immediately | After 30 sec. | After 2 min. |
|---|---|---|---|---|---|---|---|---|---|
| 70 | $R_{11}, R_{12}$ = Nonyl | l = 3 | 0.04 | 58 | 9 | o | 48 | 20 | 4 |
| 71 | $R_{11}, R_{12}$ = Nonyl | l = 6 | 0.07 | 43 | 6 | o | 58 | 22 | 7 |
| 72 | $R_{11}, R_{12}$ = Octadecyl | l = 3 | 0.05 | 67 | 8 | o | 41 | 16 | 8 |
| 73 | Y = Cumyl $R_{18}$ = H | l = 6 | 0.10 | 45 | 10 | o | 47 | 19 | 11 |
| 74 | Y = H$+$CH($C_6H_5$)—CH$_2\overline{)_2}$ $R_{18}$ = H | l = 6 | 0.08 | 52 | 9 | o | 45 | 18 | 7 |
| 75 | $C_mH_{2m}$ = $C_{12}$-$C_{14}$ Alkylene P = 2 | l = 3 | 0.09 | 33 | 10 | o | 40 | 17 | 5 |
| 76 | $C_mH_{2m}$ = $C_{18}$ Alkylene P = 2 | l = 3 | 0.06 | 45 | 11 | o | 43 | 21 | 5 |
| 77 | $C_mH_{2m}$ = $C_{18}$ Alkylene P = 2 | l = 6 | 0.08 | 37 | 7 | o | 52 | 24 | 12 |

Example 10

The emulsion polymerization of ethyl acrylate and methyl methacrylate was carried out in the same manner as in Example 8, except that the chloroglycine betaine ester of polyoxyethylene dioctyl phenyl ether having various average ethylene oxide addition mole number (i.e., $\overline{EOp}$) shown in Table 10 was used as the emulsifying agent.

The characteristics of the resultant polymer films and the foaming properties were evaluated in the same manner as in Example 8. The results are shown in Table 10.

As shown in Table 10, the sample Nos. 58, 79, 80 and 81 according to the present invention gave good results when compared with the Comparative sample Nos. 78 and 82. As is clear from the results shown in Table 10, the suitable $\overline{EOp}$ of the betaine esters if 1 to 30.

TABLE 10

| Sample No. | Emulsifying agent ($\overline{EOP}$) | Film characteristics | | | Foaming properties | |
|---|---|---|---|---|---|---|
| | | Water Resistance | Transparency | Smoothness | Immediately | After 30 sec. |
| 78* | 0 | 12 | 58 | △ | 40 | 20 |
| 58 | 3 | 62 | 13 | ○ | 42 | 20 |
| 79 | 7 | 59 | 10 | ○ | 48 | 22 |
| 80 | 18 | 35 | 21 | ○ | 58 | 23 |
| 81 | 27 | 33 | 22 | ○ | 63 | 26 |
| 82* | 33 | 12 | 25 | ○ | 74 | 52 |

*Comparative Example

Example 11

The reaction vessel used in Example 8 was charged with 4 parts of the emulsifying agent listed in Table 5 and 110 parts of water. Thus, the emulsifying agent was dissolved in the water.

Further, 50 parts of butyl acrylate and 50 parts of styrene were mixed to separately prepare the unsaturated monomer mixture.

A 10 part amount of the unsaturated monomer mixture and 5 parts of a 5% aqueous 2,2'-azobis(amidinopropane)hydrochloride solution were added to the reaction vessel and the polymerization was then started at a temperature of 60° C. Thereafter, the remaining 90 parts of the unsaturated monomer mixture was continuously dropwise added to the reaction vessel over 90 minutes. At this time, 5 parts of a 5% aqueous 2,2'-azobis(amidinopropane)hydrochloride solution was added with a half of the above amount of the unsaturated monomer mixture. After completing the addition of the unsaturated monomer mixture, the polymerization mixture was aged at a temperature of 60° C. for 90 minutes.

Polymer film was formed from the polymer emulsion obtained above and the characteristics and foaming properties of the polymer film were determined in the same manner as in Example 8.

The results are shown in Table 11.

TABLE 11

Emulsifying agent $$R_{11}\text{-}\bigcirc\text{-}O\text{+}R_{13}O\text{+}_{l}\overset{O}{\underset{\|}{C}}R_{14}\overset{R_{15}}{\underset{R_{17}}{\overset{|}{N}^{\oplus}}}-R_{16}.X^{\ominus}$$

| Sample No. | $R_{11}$ | $R_{12}$ | $R_{13}$ | $R_{14}$ | $R_{15}$ | $R_{16}$ | $R_{17}$ | $l$ | X | Film characteristics | | | Foaming properties | |
|---|---|---|---|---|---|---|---|---|---|---|---|---|---|---|
| | | | | | | | | | | Water resistance | Transparency | Smoothness | Immediately | After 30 sec. |
| 83 | $C_9H_{19}$ | | $C_4H_8$ | $CH_2$ | | | $C_2H_4OH$ | 2 | Cl | 54 | 10 | ○ | 45 | 21 |
| 84 | $C_9H_{19}$ | | $C_3H_6$ $C_2H_4$ | $CH_2$ $CH_2$ | | | $CH_3$ | 1 4 | $CH_3COO$ | 63 | 7 | ○ | 52 | 24 |
| 85 | $C_{12}H_{25}$ | | $C_3H_6$ | $CH_2$ | | | $C_2H_4OH$ | 1 | Cl | 60 | 13 | ○ | 46 | 18 |
| 86 | $C_{12}H_{25}$ | | $C_2H_4$ | $CH_2$ | | | $CH_3$ | 3 | Br | 59 | 15 | ○ | 40 | 19 |
| 87 | $C_{12}H_{25}$ | | $C_2H_4$ | $C_2H_4$ | | | $CH_3$ | 5 | $CH_3COO$ | 60 | 11 | ○ | 45 | 20 |
| 88 | $C_{12}H_{25}$ | | $C_2H_4$ | $CH_2$ | | | $CH_3$ | 7 | Cl | 53 | 7 | ○ | 55 | 24 |
| 89 | $C_{18}H_{37}$ | | $C_2H_4$ | $CH_2$ | | | $CH_3$ | 5 | Cl | 64 | 12 | ○ | 44 | 19 |

Example 12

The polymer emulsions were prepared by using the emulsifying agents listed in Table 12 in the same manner as in Example 11.

The characteristics of the polymer films and the foaming properties were determined in the same manner as in Example 8. The results are shown in Table 12.

TABLE 12

Emulsifying agent $$Y\text{-}\bigcirc\text{-}O\text{+}R_3O\text{+}_{\overline{n}}\overset{O}{\underset{\|}{C}}CH_2\text{-}\overset{\oplus}{N}(CH_3)_3.Cl^{\ominus}$$
$$R_{18}$$

| Sample No. | Phenol having two or more benzene nuclei | Oxyalkylene portion | | Film characteristics | | | Foaming properties | |
|---|---|---|---|---|---|---|---|---|
| | | EO($\overline{P}$) | PO($\overline{P}$) | Water resistance | Transparency | Smoothness | Immediately | After 30 min. |
| 90 | Y = $C_6H_5CH_2CH_2$ $R_{18}$ = H | 3 | 2 | 55 | 13 | ○ | 41 | 16 |
| 91 | Y = $C_6H_5CH_2CH_2$ $R_{18}$ = H | 5 | 0 | 50 | 12 | ○ | 43 | 18 |
| 92 | Y = $C_6H_5CH_2CH_2$ $R_{18}$ = H | 7 | 0 | 51 | 10 | ○ | 47 | 18 |
| 93 | Y = $C_6H_5CH_2CH_2$ $R_{18}$ = H | 7 | 3 | 48 | 8 | ○ | 48 | 16 |
| 94 | Y = Cumyl $R_{18}$ = H | 4 | 1 | 58 | 12 | ○ | 40 | 15 |
| 95 | Y = Cumyl $R_{18}$ = H | 3 | 2 | 60 | 14 | ○ | 39 | 15 |
| 96 | Y = Cumyl $R_{18}$ = H | 5 | 0 | 55 | 10 | ○ | 43 | 17 |
| 97 | Y = Cumyl $R_{18}$ = H | 5 | 2 | 53 | 8 | ○ | 46 | 19 |

Example 13

The emulsion polymerization of ethyl acrylate and methyl methacrylate was carried out in the same manner as in Example 8.

The foaming properties of the polymer emulsions obtained above and the film characteristics were evaluated in the same manner as in Example 8.

The results are shown in Table 13.

TABLE 13

Emulsifying agent $$CmH_{2m+2-p} \left[ O(R_3O)_l\overset{O}{\underset{\|}{C}}R_4 - \overset{R_5}{\underset{R_7}{\overset{|}{N^\oplus}}} - R_6 \cdot X^\ominus \right]_p$$

| Sample No. | m | P | $R_3$ | l | $R_5, R_6, R_7$ | X | Film characteristics Water resistance | Transparency | Smoothness | Foaming properties Immediately | After 30 sec. |
|---|---|---|---|---|---|---|---|---|---|---|---|
| 98 | 12–14 | 2 | $C_2H_4$ | 5 | $CH_3$ | Cl | 31 | 8 | o | 45 | 19 |
| 99 | 12–14 | 2 | $C_2H_4$ | 4 | $C_2H_4OH$ | Br | 33 | 9 | o | 47 | 21 |
| 100 | 12–14 | 3 | $C_3H_6$ | 6 | $CH_3$ | $CH_3COO$ | 37 | 11 | o | 48 | 16 |
| 101 | 16–18 | 2 | $C_3H_6$ $C_2H_4$ | 4 6 | $CH_3$ | Cl | 46 | 7 | o | 44 | 15 |
| 102 | 16–18 | 3 | $C_2H_4$ | 3 | $C_2H_5$ | Cl | 35 | 16 | o | 36 | 12 |
| 103 | 16–18 | 3 | $C_3H_6$ $C_2H_4$ | 6 12 | $CH_3$ | $CH_3COO$ | 34 | 8 | o | 47 | 18 |

Example 14

An unsaturated monomer mixture of 45 parts of α-methylstyrene, 10 parts of acrylonitrile, and 45 parts of methyl methacrylate, 1.5 parts of 2,2'-azobis(amidino)-propane hydrochloride, 150 parts of water, and 3.0 parts of the emulsifying agent listed in Table 14 were charged to a reaction vessel and, after replacing the vessel with nitrogen, the reaction mixture was allowed to polymerize at a temperature of 70° C. for 5 hours.

The pH of the polymer emulsion obtained above was adjusted to a pH shown in Table 14 and the separation condition of the polymer from the water was evaluated visually and by the determination of the absorbance of the separated water as follows:

◯ ... The polymer was completely separated from the water and the separated water was crystal clear. The absorbance of the water was less than 0.5.

Δ ... The polymer was insufficiently separated from the water and the separated water was white and turbid. The absorbance of the water was not less than 0.5 but less than 1.0.

x ... The polymer was not separated from the water and the absorbance of the water was 1.0 or more.

The results are shown in Table 14.

As is clear from the results shown in Table 14, when the unsaturated monomers were emulsion polymerized in the presence of the betaine ester type emulsifying agents, followed by adjusting the pH of the resultant polymer to 6 or more, the polymer compounds contained in the emulsions effectively coagulated.

Furthermore, the aqueous phase was removed after coagulating the polymer compound according to the above-mentioned treatment, followed by centrifugally separating the solid content. Thus, the solid content was recovered. In the case of the sample Nos. 104 to 109, the solid content was completely recovered.

TABLE 14

Emulsifying agent $$R_1-\left(\langle\phantom{x}\rangle\right)_l - O(R_2O)_m OCR_3 - \overset{R_4}{\underset{R_6}{\overset{|}{N^\oplus}}} - R_5 \cdot X^-$$

| Sample No. | $R_1$ | $R_2$ | $R_3$ | $R_4, R_5, R_6$ | l | m | $X^\ominus$ | Separability of polymer Adjusted pH 3.0 | 5.3 | 7.7 | 10.0 |
|---|---|---|---|---|---|---|---|---|---|---|---|
| 104 | $C_{12}H_{25}$ | — | $CH_2$ | $CH_3$ | 0 | 0 | Cl | x | x | o | o |
| 105 | $C_{18}H_{37}$ | — | $CH_2$ | $C_2H_5$ | 0 | 0 | Cl | x | x | o | o |
| 106 | $C_{18}H_{37}$ | — | $C_2H_4$ | $C_2H_4OH$ | 0 | 0 | $CH_3COO$ | x | x | o | o |
| 107 | $C_8H_{17}$ | $C_2H_4$ | $CH_2$ | $CH_3$ | 1 | 3 | Cl | x | x | o | o |
| 108 | $C_8H_{17}$ | $C_3H_6$ $C_2H_4$ | $CH_2$ | $CH_3$ | 1 | 1 2 | Cl | x | x | o | o |
| 109 | $C_{12}H_{25}$ | $C_2H_4$ | $CH_2$ | $CH_3$ | 1 | 5 | Br | x | x | o | o |
| 110*1 | Sodium alkylbenzene sulfonate | | | | | | | x | x | x | x |
| 111*1 | Hydrogenated tallow fatty acid sodium salt | | | | | | | x | x | x | x |
| 112*1 | Polyoxyethylene nonylphenyl ether ($\bar{p}$ = 9.7) | | | | | | | x | x | x | x |
| 113*1 | Trimethyl monostearyl ammonium chloride | | | | | | | *2 | *2 | *2 | *2 |

*1Comparative Example
*2Emulsion polymerization impossible

Example 15

A 3 part amount of chloroglycine betaine esters of polyoxyethylene ($\bar{p}$=3)octylphenyl ether, 150 parts of ester, 2.0 parts of 2,2'-azobis(amidino)propane hydrochloride, and the unsaturated monomer mixture listed in Table 15 were charged to the reaction vessel used in Example 14 and, after replacing the vessel with nitrogen, the reaction mixture was allowed to polymerize in the same manner as in Example 14.

The pH of the polymer emulsion obtained above was adjusted to 9 and the separation condition of the polymer from the water was evaluated in the same manner as in Example 14.

The results are shown in Table 15.

After the polymer compounds were coagulated by the above-mentioned treatment, the solid was recovered in the same manner as in Example 14. In the case of the sample Nos. 114 to 118, the solid contents were completely recovered as in the case of the sample Nos. 104 to 109.

TABLE 15

| Sample No. | Unsaturated monomer Kind A | B | C | Part (A/B/C) | Separability of polymer |
|---|---|---|---|---|---|
| 114* | Polybutadiene | Styrene | Acrylonitrile | 50/35/15 | ○ |
| 115 | Styrene | Acrylonitrile | — | 71.5/28.5/0 | ○ |
| 116 | α-Methylstyrene | Acrylonitrile | — | 70/30/0 | ○ |
| 117* | Polybutadiene | Styrene | Methylmethacrylate | 50/35/15 | ○ |
| 118 | Styrene | Butadiene | — | 90/10/0 | ○ |

*Graft polymer used.

Example 16

An unsaturated monomer mixture of 45 parts of α-methylethyrene, 10 parts of acrylonitrile, and 45 parts of methyl methacrylate, 1.5 parts of 2,2'-azobis-(amidino)propane hydrochloride, 150 parts of water, and 3.0 parts of an emulsifying agent listed in Table 16 were charged to a reaction vessel and, after replacing the vessel with nitrogen, the reaction mixture was allowed to polymerize at a temperature of 70° C. for 5 hours.

The polymer emulsion obtained above was subjected to ultrasonic irradiation for 3 minutes under the conditions of 100 W and 45 kHz. The separation condition of the polymer compounds and water was evaluated in the same manner as in Example 14. The results are shown in Table 16.

As is clear from the results shown in Table 16, when the unsaturated monomers were emulsion polymerized in the presence of the betaine ester type emulsifying agents, followed by ultrasonic irradiation, the polymer compounds contained in the emulsions effectively coagulated.

Furthermore, the aqueous phase was removed after coagulation from the polymer compound according to the above-mentioned treatment, followed by centrifugally separating the solid content. Thus, the solid content was recovered. In the case of the sample Nos. 119 to 124, the solid content was completely recovered.

TABLE 16

Emulsifying agent $$R_1-\left(\bigcirc\right)_l-O+R_2O)_mOCR_3-\underset{R_6}{\overset{R_4}{\underset{|}{N}}}{}^\oplus-R_5.X^\ominus$$

| Sample No. | $R_1$ | $R_2$ | $R_3$ | $R_4, R_5, R_6$ | $l$ | $m$ | $X^\ominus$ | Separability of polymer |
|---|---|---|---|---|---|---|---|---|
| 119 | $C_{12}H_{25}$ | — | $CH_2$ | $CH_3$ | 0 | 0 | Cl | ○ |
| 120 | $C_{18}H_{37}$ | — | $CH_2$ | $CH_3$ | 0 | 0 | Br | ○ |
| 121 | $C_{18}H_{37}$ | — | $C_2H_4$ | $C_2H_4OH$ | 0 | 0 | $CH_3COO$ | ○ |
| 122 | $C_8H_{17}$ | $C_2H_4$ | $CH_2$ | $CH_3$ | 1 | 3 | Cl | ○ |
| 123 | $C_8H_{17}$ | $C_3H_6$ $C_2H_4$ | $CH_2$ | $CH_3$ | 1 | 1 2 | Cl | ○ |
| 124 | $C_{12}H_{25}$ | $C_5H_4$ | $CH_2$ | $CH_3$ | 1 | 5 | Br | ○ |
| 125*1 | Sodium alkylbenzene sulfonate | | | | | | | x |
| 126*1 | Polyoxyethylene lauryl ether sulfate ($\bar{P} = 3$) | | | | | | | x |
| 127*1 | Hydrogenated tallow fatty acid sodium salt | | | | | | | x |
| 128*1 | Polyoxyethylene nonylphenyl ether ($\bar{p} = 9.7$) | | | | | | | x |

*1 Comparative Example

Example 17

A 3 part amount of chloroglycine betaine esters of polyoxyethylene ($\bar{p}=3$) stearyl ether, 150 parts of water, 2.0 parts of 2,2'-azobis(amidino)propane hydrochloride, and the unsaturated monomer mixture listed in Table 17 were charged to the reaction vessel used in Example 14 and, after replacing the vessel with nitrogen, the reaction mixture was allowed to polymerize in the same manner as in Example 14.

The resultant polymer emulsion was subjected to ultrasonic irradiation for one minute under the conditions of 210 W and 28 kHz. The separation condition of the polymer from the water was evaluated in the same manner as in Example 14.

The results are shown in Table 17.

After coagulating the polymer compounds according to the above-mentioned treatment, the solid content was completely recovered in the same manner as in Example 14.

TABLE 17

| Sample No. | Unsaturated monomer Kind A | B | C | Part (A/B/C) | Separability of polymer |
|---|---|---|---|---|---|
| 129*1 | Polybutadiene | Styrene | Acrylonitrile | 50/35/15 | ○ |
| 130 | Styrene | Acrylonitrile | — | 71.5/28.5/0 | ○ |
| 131 | α-Methylstyrene | Acrylonitrile | — | 70/30/0 | ○ |
| 132*1 | Polybutadiene | Styrene | Methylmethacrylate | 50/35/15 | ○ |
| 133 | Styrene | Butadiene | — | 90/10/0 | ○ |

*1 Graft polymer used.

We claim:

1. An emulsifying agent for emulsion polymerization comprising at least one member selected from the group consisting of compounds having the formula (II) and (III):

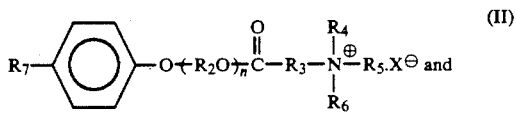

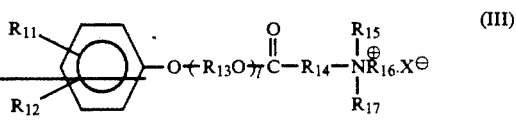

wherein $R_2$ represents an alkylene group having 2 to 4 carbon atoms, $R_3$ represents an alkylene group having 1 to 5 carbons atoms, $R_4$ to $R_6$ independently represent an alkyl group having 1 to 3 carbon atoms or —$C_2H_4OH$, n represents an average addition mole number of 1 to 20, and X represents an inorganic or organic anion, $R_7$ represents an alkyl group having 6 to 20 carbon atoms, $R_{11}$ and $R_{12}$ independently represent an alkyl group having 6 to 20 carbon atoms, $R_{13}$ represents an alkylene group having 2 to 4 carbon atoms, $R_{14}$ represents an alkylene group having 1 to 5 carbon atoms, $R_{15}$, $R_{16}$ and $R_{17}$ independently represent an alkyl group having 1 to 3 carbon atoms or —$C_2H_4OH$, and l is an average addition mole number of 1 to 30.

2. An emulsifying agent for emulsion polymerization according to claim 1, wherein said emulsifying agent is a compound of formula (II).

3. An emulsifying agent for emulsion polymerization according to claim 1, wherein said emulsifying agent is a compuond of formula (III).

4. An emulisifying agent represented by the following formula

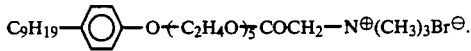

* * * * *